United States Patent
Nakagami et al.

(10) Patent No.: US 10,662,946 B2
(45) Date of Patent: May 26, 2020

(54) ELECTRIC COMPRESSOR, CONTROL DEVICE, AND MONITORING METHOD

(71) Applicant: MITSUBISHI HEAVY INDUSTRIES THERMAL SYSTEMS, LTD., Tokyo (JP)

(72) Inventors: Takashi Nakagami, Tokyo (JP); Takayuki Takashige, Kiyosu (JP)

(73) Assignee: MITSUBISHI HEAVY INDUSTRIES THERMAL SYSTEMS, LTD., Tokyo (JP)

(*) Notice: Subject to any disclaimer, the term of this patent is extended or adjusted under 35 U.S.C. 154(b) by 197 days.

(21) Appl. No.: 15/558,415

(22) PCT Filed: Feb. 16, 2016

(86) PCT No.: PCT/JP2016/054407
§ 371 (c)(1),
(2) Date: Sep. 14, 2017

(87) PCT Pub. No.: WO2016/152320
PCT Pub. Date: Sep. 29, 2016

(65) Prior Publication Data
US 2018/0058454 A1    Mar. 1, 2018

(30) Foreign Application Priority Data
Mar. 20, 2015    (JP) ................... 2015-058366

(51) Int. Cl.
*F04C 28/28* (2006.01)
*F04B 49/10* (2006.01)
(Continued)

(52) U.S. Cl.
CPC .............. *F04C 28/28* (2013.01); *F04B 35/04* (2013.01); *F04B 49/10* (2013.01); *F04C 23/001* (2013.01);
(Continued)

(58) Field of Classification Search
CPC ........ F04C 28/28; F04C 28/08; F04C 23/001; F04C 29/0085; F04C 18/0215;
(Continued)

(56) References Cited

U.S. PATENT DOCUMENTS 8,777,585 B2 * 7/2014 Nakano ................ F04B 49/065
                                                                                                                             417/44.11
2007/0215903 A1 * 9/2007 Sakamoto ......... H01L 23/49844
                                                                                                                                257/192
(Continued)

FOREIGN PATENT DOCUMENTS

JP      2007-92636 A    4/2007
JP      2009-127502 A    6/2009
(Continued)

OTHER PUBLICATIONS

International Search Report and Written Opinion of the International Searching Authority (Forms PCT/ISA/237 and PCT/ISA/210) for International Application No. PCT/JP2016/054407, dated May 24, 2016, with English translations.

*Primary Examiner* — Peter J Bertheaud
*Assistant Examiner* — Dnyanesh G Kasture
(74) *Attorney, Agent, or Firm* — Birch, Stewart, Kolasch & Birch, LLP (57) ABSTRACT

This electric compressor includes a compressor which rotates to compress a fluid, a motor which rotatably drives the compressor, and a control unit which controls current supply to the motor using first and second components. An allowable current for first and second components exposed to the same temperature is set to be smaller in the second component than in the first component. The second component is disposed at a place in which cooling capability is greater than that of the first component so that allowable power of the second component at rated use is greater than allowable power of the first component. This electric com-
(Continued)

pressor includes a temperature sensor which detects the temperature of the first component and a calculation unit which outputs an alarm signal when the detected temperature and a current flowing in the first component satisfy a predetermined condition.

8 Claims, 5 Drawing Sheets

(51) Int. Cl.

| | | |
|---|---|---|
| *F04B 35/04* | (2006.01) | |
| *F04C 23/00* | (2006.01) | |
| *H02P 29/68* | (2016.01) | |
| *F04C 28/08* | (2006.01) | |
| *F04C 29/00* | (2006.01) | |
| *F04C 29/04* | (2006.01) | |
| *F04C 18/02* | (2006.01) | |

(52) U.S. Cl.
CPC ......... *F04C 28/08* (2013.01); *F04C 29/0085* (2013.01); *H02P 29/68* (2016.02); *F04B 2203/0205* (2013.01); *F04C 18/0215* (2013.01); *F04C 29/045* (2013.01); *F04C 2240/40* (2013.01); *F04C 2240/81* (2013.01); *F04C 2270/075* (2013.01); *F04C 2270/195* (2013.01); *F04C 2270/78* (2013.01)

(58) Field of Classification Search
CPC .............. F04C 2270/78; F04C 2240/81; F04C 2240/40; F04C 2270/075; F04C 2270/195; F04C 29/045; F04B 35/04; F04B 49/10; F04B 2203/0205; H02P 29/68

See application file for complete search history.

(56) References Cited

U.S. PATENT DOCUMENTS

| | | | |
|---|---|---|---|
| 2010/0172764 A1 | 7/2010 | Nakano et al. | |
| 2010/0209266 A1* | 8/2010 | Ikeda | F04B 35/04 417/410.1 |
| 2014/0286064 A1* | 9/2014 | Kamizuma | H01G 4/258 363/123 |
| 2016/0094047 A1* | 3/2016 | Finkenzeller | H01G 7/04 307/104 |

FOREIGN PATENT DOCUMENTS

| | | |
|---|---|---|
| JP | 4853251 B2 | 1/2012 |
| JP | 5039515 B2 | 10/2012 |

* cited by examiner

ELECTRIC COMPRESSOR, CONTROL DEVICE, AND MONITORING METHOD

TECHNICAL FIELD

The present invention relates to an electric compressor, a control device, and a monitoring method.

Priority is claimed on Japanese Patent Application No. 2015-058366, filed Mar. 20, 2015, the content of which is incorporated herein by reference.

BACKGROUND ART

Components with a possibility of being thermally damaged such as switching devices are used in an electric compressor. Technologies for protecting such components from thermal damage have been proposed.

For example, in an electric compressor disclosed in Patent Literature 1, to protect a component from thermal damage, an allowable current value of the component is obtained on the basis of a temperature detected by a temperature detector and the electric compressor is stopped when a current flowing in the component exceeds the allowable value.

CITATION LIST

Patent Literature

[Patent Literature 1]
Japanese Patent No. 5039515

SUMMARY OF INVENTION

Technical Problem

As miniaturization of electric compressors advances, when a capacitor is disposed near a switching device, there is a possibility of the capacitor being thermally damaged due to heat generated by the switching device and it is necessary to protect both the switching device and the capacitor from the thermal damage. In such a case, it is preferable to be able to protect a plurality of components from thermal damage with a simple hardware configuration and simple processing.

The present invention provides an electric compressor, a control device, and a monitoring method that allow a plurality of components to be protected from thermal damage with a simple hardware configuration and simple processing.

Solution to Problem

According to a first aspect of the present invention, an electric compressor includes a compressor which rotates around an axis to compress a fluid, a motor which rotatably drives the compressor around the axis, and a control unit having a first component and a second component and controlling current supply to the motor during driving using the first component and the second component. An allowable current when the first component and the second component are exposed to the same temperature is set to be smaller in the second component than in the first component. The second component is disposed at a place in which cooling capability is greater than that of the first component so that allowable power of the second component at rated use is set to be greater than allowable power of the first component. This electric compressor includes a temperature sensor which detects a temperature of the first component and a calculation unit which outputs an alarm signal when the temperature detected by the temperature sensor and a current flowing in the first component satisfy a predetermined condition.

The second component may be provided on upstream from the first component on a refrigerant flow path.

A housing may be provided both between the first component and the refrigerant flow path and between the second component and the refrigerant flow path. A thickness of the housing between the second component and the refrigerant flow path may be smaller than a thickness of the housing between the first component and the refrigerant flow path so that thermal resistance of the housing between the second component and the refrigerant flow path is smaller than thermal resistance of the housing between the first component and the refrigerant flow path.

A heat conductive member which is able to conduct heat to at least a part of the second component may be provided and the heat conductive member may be in contact with a member having a temperature lower than that of the second component.

The first component and the second component may be separately provided on different substrates and a heat insulating portion which is able to conduct electricity may be provided between a substrate on which the first component is provided and a substrate on which the second component is provided.

The second component may include a heat-dissipation fin.

A heat pipe which is able to exchange heat with the second component may be provided and the heat pipe may be in contact with a member having a temperature lower than that of the second component.

A Peltier device which absorbs heat from the second component may be provided.

According to a second aspect of the present invention, a control device includes a first component and a second component and controls current supply to a motor during driving using the first component and the second component. An allowable current when the first component and the second component are exposed to the same temperature is set to be smaller in the second component than in the first component. The second component is disposed at a place in which cooling capability is greater than that of the first component so that allowable power of the second component at rated use is set to be greater than allowable power of the first component. The control device further includes a temperature sensor which detects a temperature of the first component and a calculation unit which outputs an alarm signal when the temperature detected by the temperature sensor and a current flowing in the first component satisfy a predetermined condition.

According to a third aspect of the present invention, a method of monitoring is a method of monitoring an electric compressor, and the electric compressor includes a compressor which rotates around an axis to compress a fluid, a motor which rotatably drives the compressor around the axis, and a control unit having a first component and a second component and controlling current supply to the motor during driving using the first component and the second component. An allowable current when the first component and the second component are exposed to the same temperature is set to be smaller in the second component than in the first component. The second component is disposed at a place in which cooling capability is greater than that of the first component so that allowable power of the second component at rated use is set to be greater than allowable power of the first component. The method of monitoring includes a temperature detection step of detecting a temperature of the first component and an alarm output step of outputting an alarm signal when the temperature detected in the temperature detection step and a current flowing in the first component satisfy a predetermined condition.

Advantageous Effects of the Invention

According to the above-described electric compressor, control device, and monitoring method, it is possible to protect all of the plurality of components from thermal damage without needing to provide a plurality of temperature sensors.

DESCRIPTION OF EMBODIMENTS

Hereinafter, embodiments of the present invention will be described, but the scope of the present invention is not limited to the following embodiments. In addition, all of the combinations of features described in the embodiments are not necessarily essential to solving means of the invention.

Figure 1:
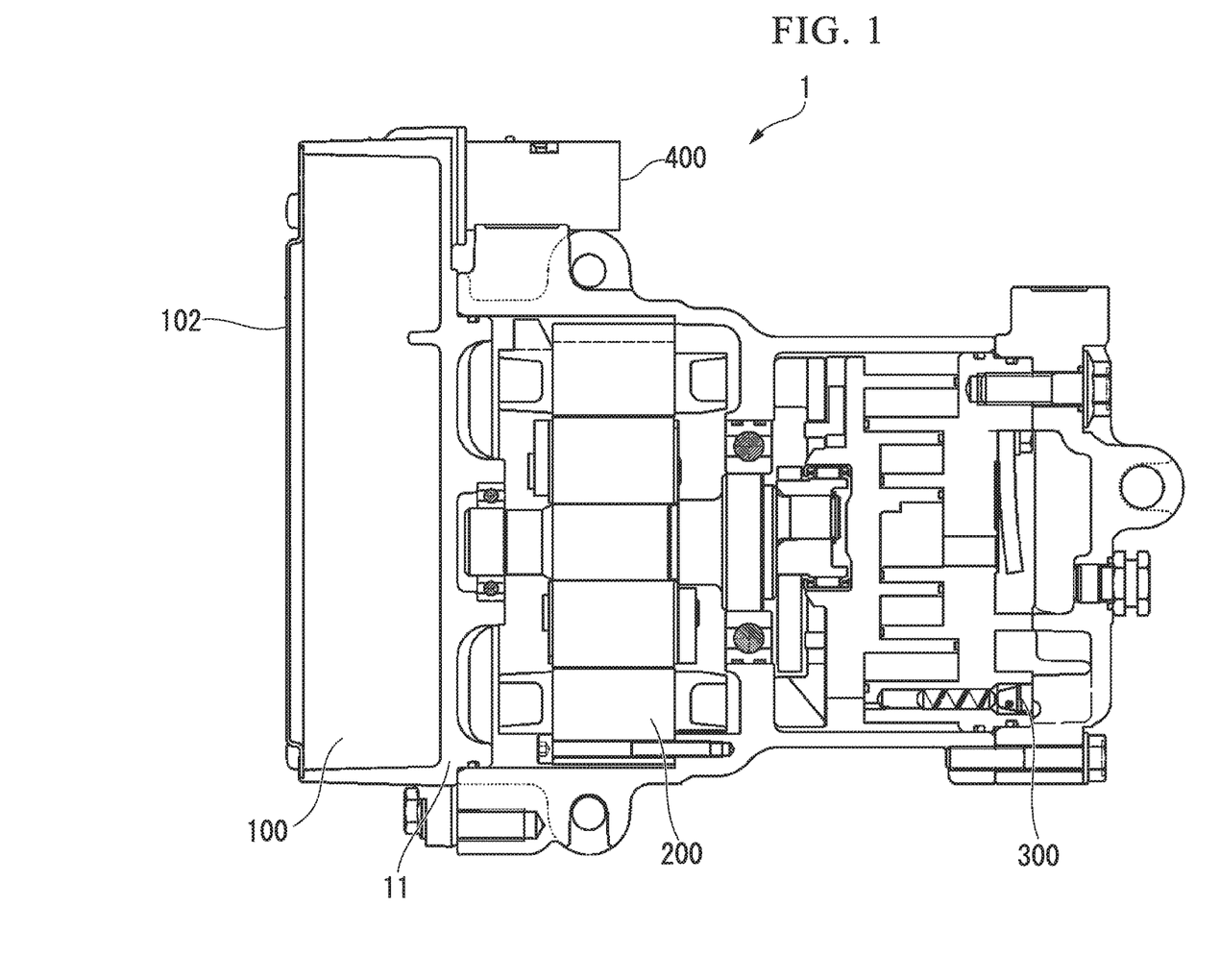
FIG. 1 is a schematic cross-sectional view showing a configuration of an electric compressor according to one embodiment of the present invention.

FIG. 1 is a schematic cross-sectional view showing a configuration of an electric compressor according to one embodiment of the present invention. Referring to FIG. 1, an electric compressor 1 includes an inverter 100, a motor 200, and a compressor 300. The inverter 100, the motor 200, and the compressor 300 are provided in a housing 11 of the electric compressor.

Also, a refrigerant inlet 400 is provided in the electric compressor 1.

The electric compressor 1 is a scroll type compressor. The electric compressor 1 compresses the refrigerant suctioned from the refrigerant inlet 400 by the compressor 300 and outputs the compressed refrigerant. Further, as will be described below, the refrigerant suctioned from the refrigerant inlet 400 of the electric compressor 1 is also used for cooling the inverter 100. Further, the refrigerant here corresponds to an example of a fluid compressed by the compressor.

The inverter 100 converts a direct current (DC) supplied from a storage battery outside the electric compressor 1 into a three-phase alternating current (AC) and supplies it to the motor 200. The inverter 100 corresponds to an example of a control unit and an example of a control device, and controls current supply to the motor 200 to control an operation of the motor 200.

The motor 200 receives electric power from the inverter 100 and generates a rotational force. In addition, the motor 200 is connected to a movable scroll of the compressor 300 via a rotating shaft and rotatably drives the movable scroll around an axis by the generated rotational force.

The compressor 300 suctions and compresses a refrigerant by rotating the movable scroll around the axis by the rotational force from the motor 200.

First Embodiment

Figure 2:
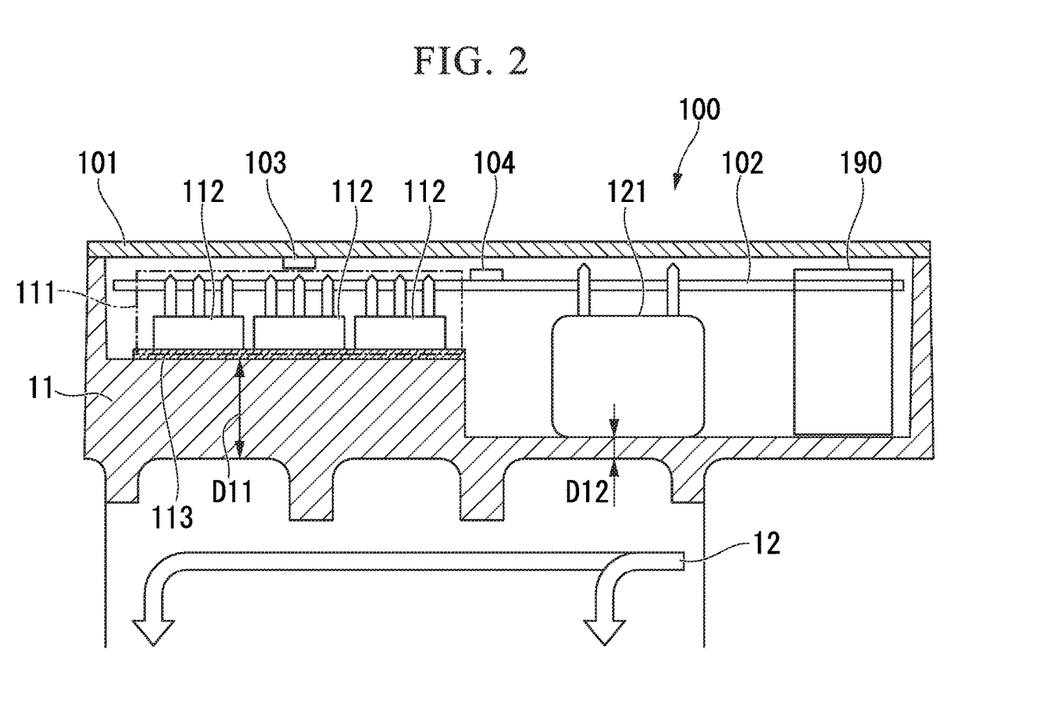
FIG. 2 is a schematic cross-sectional view showing a configuration of an inverter according to a first embodiment of the present invention.

FIG. 2 is a schematic cross-sectional view showing a configuration of the inverter 100 according to a first embodiment of the present invention. The inverter 100 is provided in the housing 11. The inverter 100 includes an inverter cover 101, a substrate 102, a temperature sensor 103, a current sensor 104, a power conversion circuit 111 including three power semiconductors 112, a heat-dissipation sheet 113, and a capacitor 121.

In FIG. 2, an example of a refrigerant flow path 12 and an example of an installation position of a monitoring device 190 are shown. The refrigerant introduced from the refrigerant inlet 400 shown in FIG. 1 comes into contact with the housing 11 in which the inverter 100 is provided as shown in FIG. 2 to cool components of the inverter 100, and then reaches the compressor 300 to be compressed.

The inverter cover 101 is provided in the housing 11 to cover the inverter 100. The inverter cover 101 protects the inverter 100 from dust or the like.

The substrate 102 includes a printed pattern to conduct current to the components provided on the substrate 102. Particularly, the substrate 102 conducts current to the power semiconductors 112 and the capacitor 121.

The temperature sensor 103 is installed in contact with the power semiconductors 112 or in the vicinity of the power semiconductors 112 to detect the temperature of the power semiconductors 112. When a plurality of power semiconductors 112 are provided as shown in FIG. 2, the temperature sensor 103 is disposed at a position for detecting the temperature of a power semiconductor 112 considered to have the highest temperature, such as the power semiconductor 112 at a center, for example.

The current sensor 104 detects the current value of the power semiconductor 112 (a current value of the current flowing through the power semiconductor 112). The current value detected by the current sensor 104 may be a current value by which it can be determined whether or not the current value of the power semiconductor 112 is greater than an allowable current value. For example, when an instantaneous maximum allowable current value for each temperature of the power semiconductor 112 is already known, the current sensor 104 may detect the instantaneous maximum allowable current value of the power semiconductor 112.

The power conversion circuit 111 converts DC power supplied from a storage battery outside the electric compressor 1 into three-phase AC power. The power conversion circuit 111 adjusts a magnitude of the obtainable three-phase AC power. Each of the power semiconductors 112 is a switching device such as an insulated gate bipolar transistor (IGBT) or a metal oxide semiconductor field effect transistor (MOS-FET). The power semiconductor 112 converts DC power from the storage battery into power of one phase of three-phase AC.

Also, the power semiconductor 112 adjusts a magnitude of the power obtainable by conversion by adjusting switching time.

In addition, the power semiconductor 112 corresponds to an example of a first component. The power semiconductor 112 generates heat due to the current flowing therethrough. Further, since there is a possibility of the power semiconductor 112 being thermally damaged, for example, the absolute rated temperature is set to 150 to 175 degrees (° C.).

The heat-dissipation sheet 113 is provided between the power semiconductor 112 and the housing 11. The heat-dissipation sheet 113 conducts heat of the power semiconductor 112 to the housing 11.

The capacitor 121 reduces noise included in the three-phase AC power obtained by the power conversion circuit 111.

The capacitor 121 corresponds to an example of a second component. Since there is a possibility of the capacitor 121 being thermally damaged, for example, the absolute rated temperature is set to 80 to 125 degrees.

As the capacitor 121, various capacitors such as a film capacitor or an electrolytic capacitor can be used.

When the absolute rated temperature of the power semiconductor 112 is compared with an absolute rated temperature of the capacitor 121, the absolute rated temperature of the capacitor 121 is lower. Therefore, when the power semiconductor 112 and the capacitor 121 are exposed to the same temperature, an allowable current is smaller than that of the power semiconductor 112.

Figure 3:
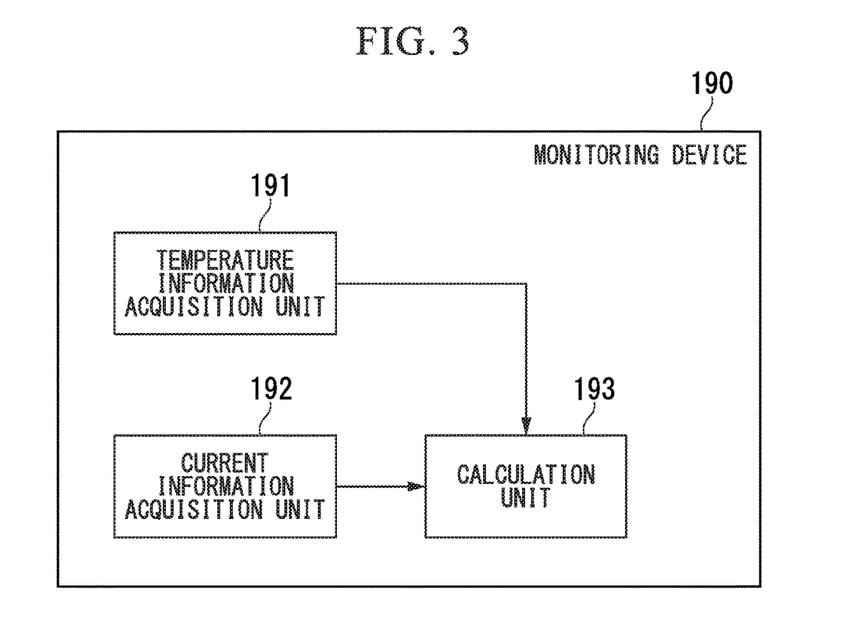
FIG. 3 is a schematic block diagram showing a functional configuration of a monitoring device according to the first embodiment.

FIG. 3 is a schematic block diagram showing a functional configuration of the monitoring device 190. The monitoring device 190 includes a temperature information acquisition unit 191, a current information acquisition unit 192, and a calculation unit 193.

The temperature information acquisition unit 191 acquires a sensor signal from the temperature sensor 103. Thereby, the temperature information acquisition unit 191 acquires temperature information indicating a temperature of the power semiconductor 112 detected by the temperature sensor 103.

The current information acquisition unit 192 acquires a sensor signal from the current sensor 104. Thereby, the current information acquisition unit 192 acquires current information indicating the current value of the power semiconductor 112 (the current value of the current flowing through the power semiconductor 112) detected by the current sensor 104.

The calculation unit 193 outputs an alarm signal when the temperature of the power semiconductor 112 detected by the temperature sensor 103 and the current value of the power semiconductor 112 detected by the current sensor 104 satisfy a predetermined condition. Specifically, the correlation between a temperature of the power semiconductor 112 and the allowable current is pre-stored in the calculation unit 193. Also, the calculation unit 193 obtains the allowable current value of the power semiconductor 112 for the temperature on the basis of the temperature of the power semiconductor 112 detected by the temperature sensor 103. Also, the calculation unit 193 determines whether or not the current value of the power semiconductor 112 detected by the current sensor 104 is greater than the allowable current of the power semiconductor 112. When it is determined that the current value of the power semiconductor 112 is greater than the allowable current value, the calculation unit 193 outputs an alarm signal.

Further, an installation position of the monitoring device 190 is not limited to the position shown in FIG. 2. The monitoring device 190 may be disposed at another position in the inverter 100 or may be disposed outside the inverter 100.

Here, a correlation between the temperature and the allowable temperature of the power semiconductor 112 and between a temperature and an allowable temperature of the capacitor 121 will be described with reference to expressions.

The correlation between the temperature of the power semiconductor 112 and the temperature of the housing 11 is represented by Expression (1).

[Math. 1]

$$T_3 = T_1 - (R_{1-3} \times P_1) \tag{2}$$

Here, $T_1$ indicates the temperature of the power semiconductor 112. $T_3$ indicates the temperature of the housing 11. $R_{1-3}$ indicates thermal resistance between the power semiconductor 112 and the housing 11. $P_1$ indicates a component which is thermally conducted to the housing 11 among heat generation due to power loss in the power semiconductor 112.

Expression (1) is transformed to obtain Expression (2).

[Math. 2]

$$T_1 - T_2 = R_{1-2} \times P_3 \tag{3}$$

Also, a correlation between a temperature of the power semiconductor 112 and a temperature of the capacitor 121 is represented by Expression (3).

[Math. 3]

$$P_3 = (T_1 - T_2)/R_{1-2} \tag{4}$$

Here, $T_2$ indicates a temperature of the capacitor 121. $R_{1-2}$ indicates thermal resistance between the power semiconductors 112 and the capacitor 121. $P_3$ indicates a component which is thermally conducted to the capacitor 121 among the heat generation due to the power loss in the power semiconductor 112.

Expression (3) is transformed to obtain Expression (4).

[Math. 4]

$$P_3 = (T_1 - T_2)/R_{1-2} \tag{4}$$

Also, a correlation between the temperature of the capacitor 121 and the temperature of the housing is represented by Expression (5).

[Math. 5]

$$T_2 - T_3 = R_{2-3} \times (P_2 + P_3) \tag{5}$$

Here, $R_{2-3}$ indicates thermal resistance between the capacitor 121 and the housing 11. $P_2$ indicates heat generation due to power loss in the capacitor 121.

Expression (6) is obtained by transforming Expression (5) and substituting Expressions (2) and (4).

[Math. 6]

$$T_2 = R_{2-3} \times P_2 + R_{2-3}/R_{1-2} \times (T_1 - T_2) + (T_1 - R_{1-3} \times P_1) \tag{6}$$

Expression (6) is further transformed to obtain Expression (7).

[Math. 7]

$$(1+R_{2-3}/R_{1-2}) \times T_2 = (1+R_{2-3}/R_{1-2}) \times T_1 - R_{1-3} \times P_1 + R_{2-3} \times P_2 \quad (7)$$

Expression (7) is further transformed to obtain Expression (8).

[Math. 8]

$$T_2 = T_1 - \frac{R_{1-2}}{R_{1-2} + R_{2-3}}(R_{1-3} \times P_1 - R_{2-3} \times P_2) \quad (8)$$

Here, a temperature limitation (allowable temperature) of the power semiconductor 112 is set as $T_{limit1}$ and a temperature limitation (allowable temperature) of the capacitor 121 is set as $T_{limit2}$. Also, as expressed by Expression (9), the allowable temperature of the power semiconductor 112 is set to be higher than the allowable temperature of the capacitor 121.

[Math. 9]

$$T_{limit1} > T_{limit2} \quad (9)$$

According to Expression (9), an allowable current when the power semiconductor 112 and the capacitor 121 are exposed to the same temperature is set to be smaller in the capacitor 121 than in the power semiconductor 112.

In a case in which Expression (10) is satisfied, when the temperature of the power semiconductor 112 is equal to or lower than the allowable temperature, the temperature of the capacitor 121 is also equal to or lower than the allowable temperature.

[Math. 10]

$$T_{limit2} - T_2 > T_{limit1} - T_1 \quad (10)$$

Expression (10) is transformed to obtain Expression (11).

[Math. 11]

$$T_1 - T_2 > T_{limit1} - T_{limit2} \quad (11)$$

Expression (12) is obtained from Expressions (11) and (8).

[Math. 12]

$$T_1 - T_2 = \frac{R_{1-2}}{R_{1-2} + R_{2-3}}(R_{1-3} \times P_1 - R_{2-3} \times P_2) > T_{limit1} - T_{limit2} \quad (12)$$

Expression (13) is obtained from Expression (12).

[Math. 13]

$$(R_{1-3} \times P_1 - R_{2-3} \times P_2) > \left(1 + \frac{R_{2-3}}{R_{1-2}}\right) \times (T_{limit1} - T_{limit2}) \quad (13)$$

In a case in which Expression (13) is satisfied, when the temperature of the power semiconductor 112 is equal to or lower than the allowable temperature, the temperature of the capacitor 121 is also equal to or lower than the allowable temperature. Therefore, both the power semiconductor 112 and the capacitor 121 can be protected from thermal damage by monitoring the temperature of the power semiconductor 112.

Since heat generation $P_2$ of the capacitor 121 is sufficiently smaller than heat generation $P_1$ of the power semiconductor 112, by adjusting thermal resistance between the housing 11, the power semiconductor 112, and the capacitor 121 according to Expression (13), Expression (13) can be satisfied.

Particularly, by disposing the capacitor 121 at a place in which the cooling capability is greater than that of the power semiconductor 112, when the temperature of the power semiconductor 112 is equal to or lower than the allowable temperature, the temperature of the capacitor 121 can also be made equal to or lower than the allowable temperature. For example, the capacitor 121 is disposed at a place in which the cooling capability is large to reduce the thermal resistance between the capacitor 121 and the housing 11.

Therefore, in the present embodiment, as shown in FIG. 2, the capacitor 121 is disposed upstream from the power semiconductor 112 on the refrigerant flow path 12.

Here, since the temperature rises due to cooling of the components or the like, the cooling capability decreases. Therefore, the cooling capability of the refrigerant on the upstream side of the refrigerant flow path 12 is higher than that on the downstream side. Thus, since the capacitor 121 is disposed upstream from the power semiconductor 112 on the refrigerant flow path 12, the capacitor 121 is disposed at a place in which the cooling capability is greater than that of the power semiconductor 112.

In addition, in the present embodiment, as shown in FIG. 2, the housing 11 is provided both between the power semiconductor 112 and the refrigerant flow path 12 and between the capacitor 121 and the refrigerant flow path 12.

Also, a thickness D12 of the housing 11 between the capacitor 121 and the refrigerant flow path 12 is smaller than a thickness D11 of the housing 11 between the power semiconductor 112 and the refrigerant flow path 12.

Therefore, thermal resistance between the capacitor 121 and the refrigerant flow path 12 is smaller than thermal resistance between the power semiconductor 112 and the refrigerant flow path 12. Accordingly, the capacitor 121 is more easily cooled by the refrigerant than the power semiconductor 112. As described above, the capacitor 121 is disposed at a place in which the cooling capability is greater than that of the power semiconductor 112.

As described above, since the capacitor 121 is disposed at a place in which the cooling capability is greater than that of the power semiconductor 112, allowable power of the capacitor 121 at rated use is set to be greater than allowable power of the power semiconductor 112.

When the temperature of the power semiconductor 112 detected by the temperature sensor 103 and the current flowing in the power semiconductor 112 satisfy a predetermined condition, the calculation unit 193 outputs an alarm signal. Specifically, the calculation unit 193 outputs an alarm signal when the current of the power semiconductor 112 is greater than the allowable current.

Accordingly, since the current of the capacitor 121 is also equal to or less than the allowable current when the current of the power semiconductor 112 is equal to or less than the allowable current, by detecting the temperature and current of the power semiconductor 112, both the power semiconductor 112 and the capacitor 121 can be protected from thermal damage without needing to detect the temperature of the capacitor 121.

Here, as a method of protecting both the power semiconductor 112 and the capacitor 121 from thermal damage, a method of measuring temperatures of both the power semiconductor 112 and the capacitor 121 and obtaining respective allowable current values can be considered. In this case, when a current exceeds the allowable value in either the power semiconductor 112 or the capacitor 121, the electric compressor is stopped.

However, this method requires the temperatures of both the power semiconductor 112 and the capacitor 121 to be measured, which increases the size and cost of the electric compressor 1. Also, since the control of the electric compressor is performed on the basis of the temperatures of both the power semiconductor 112 and the capacitor 121, the control becomes complicated and cost of developing control software may increase.

On the other hand, according to the present embodiment, both the power semiconductor 112 and the capacitor 121 can be protected from thermal damage by detecting the temperature and the current of the power semiconductor 112 without needing to detect the temperature of the capacitor 121. In this regard, it is possible to avoid increases in both size and cost of the electric compressor 1 and avoid the increase in cost of developing control software.

Also, since the capacitor 121 is provided upstream from the power semiconductor 112 on the refrigerant flow path 12, the capacitor 121 can be disposed at a place in which the cooling capability is greater than that of the power semiconductor 112. In this way, since the allowable power of the capacitor 121 at rated use is set to be greater than the allowable power of the power semiconductor 112, as described above, both the power semiconductor 112 and the capacitor 121 can be protected from thermal damage without needing to detect the temperature of the capacitor 121.

Also, since the thickness D12 of the housing 11 between the capacitor 121 and the refrigerant flow path 12 is smaller than the thickness D11 of the housing 11 between the power semiconductor 112 and the refrigerant flow path 12, the capacitor 121 can be disposed at a place in which the cooling capability is greater than that of the power semiconductor 112. In this way, since the allowable power of the capacitor 121 at rated use is set to be greater than the allowable power of the power semiconductor 112, as described above, both the power semiconductor 112 and the capacitor 121 can be protected from thermal damage without needing to detect the temperature of the capacitor 121.

As described above, either one of the configuration of disposing the capacitor 121 upstream from the power semiconductor 112 on the refrigerant flow path 12 and the configuration of setting the thickness D12 of the housing 11 between the capacitor 121 and the refrigerant flow path 12 to be smaller than the thickness D11 of the housing 11 between the power semiconductor 112 and the refrigerant flow path 12 may be implemented or both may be implemented. Further, either one may be implemented in combination with another embodiment, or both may be implemented in combination with another embodiment.

Figure 4:
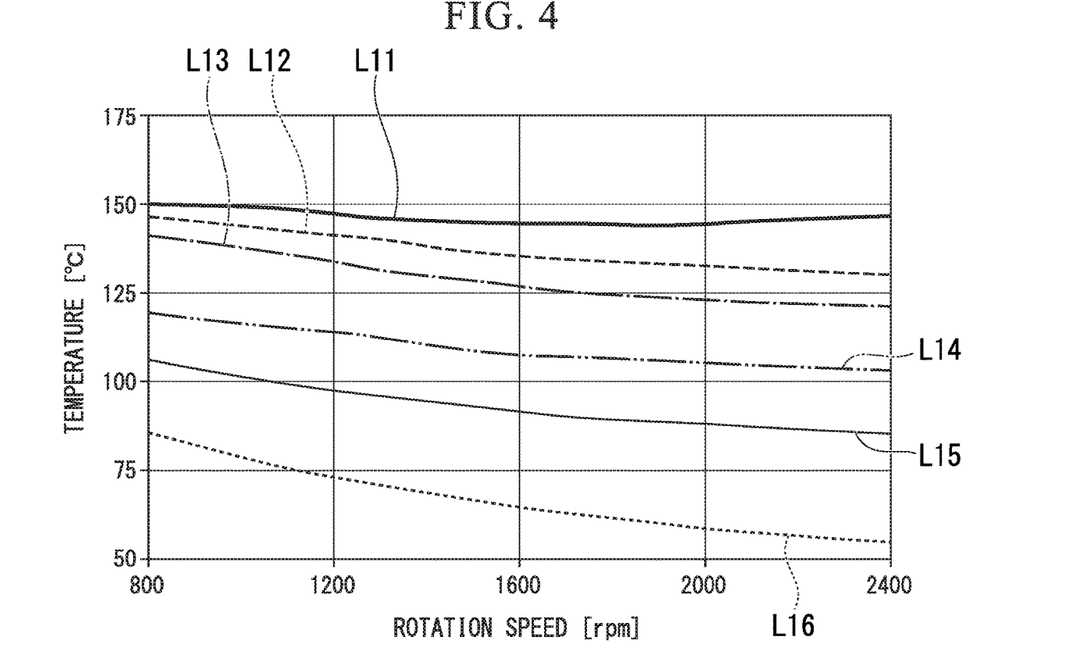
FIG. 4 is a graph showing an example of a correlation between a temperature of a power semiconductor and a temperature of a capacitor according to the first embodiment.

FIG. 4 is a graph showing an example of a correlation between the temperature of the power semiconductor 112 and the temperature of the capacitor 121. In FIG. 4, the horizontal axis represents a rotation speed of the compressor 300, and the vertical axis represents a temperature.

Also, a line L11 shows the temperature of the power semiconductor 112. A line L12 shows the temperature of the capacitor 121 when cooling is insufficient. A line L13 shows the temperature of the inverter cover 101 when cooling is insufficient. A line L14 shows the temperature of the capacitor 121 when cooling is sufficient.

A line L15 shows the temperature of the inverter cover 101 when cooling is sufficient. A line L16 shows the temperature of the refrigerant.

In the example of FIG. 4, the allowable temperature of the power semiconductor 112 is 175 degrees (° C.), and the allowable temperature of the capacitor 121 is 125 degrees.

While the temperature of the power semiconductor 112 (line L11) is within the allowable temperature of 175 degrees, the temperature of the capacitor 121 (line L12) when cooling is insufficient exceeds the allowable temperature of 125 degrees. Therefore, when the cooling is insufficient, even if it is monitored whether the temperature of the power semiconductor 112 does not exceed the allowable temperature, there may be a case in which the capacitor 121 cannot be protected from thermal damage.

On the other hand, the temperature of the capacitor 121 (line L15) when the cooling is sufficient is within the allowable temperature of 125 degrees. If the capacitor 121 is sufficiently cooled, when the temperature of the power semiconductor 112 is within the allowable temperature, the temperature of the capacitor 121 can also be made to be within the allowable temperature.

In this case, by monitoring whether the temperature of the power semiconductor 112 does not exceed the allowable temperature, both the power semiconductor 112 and the capacitor 121 can be protected from thermal damage.

Second Embodiment

Figure 5:
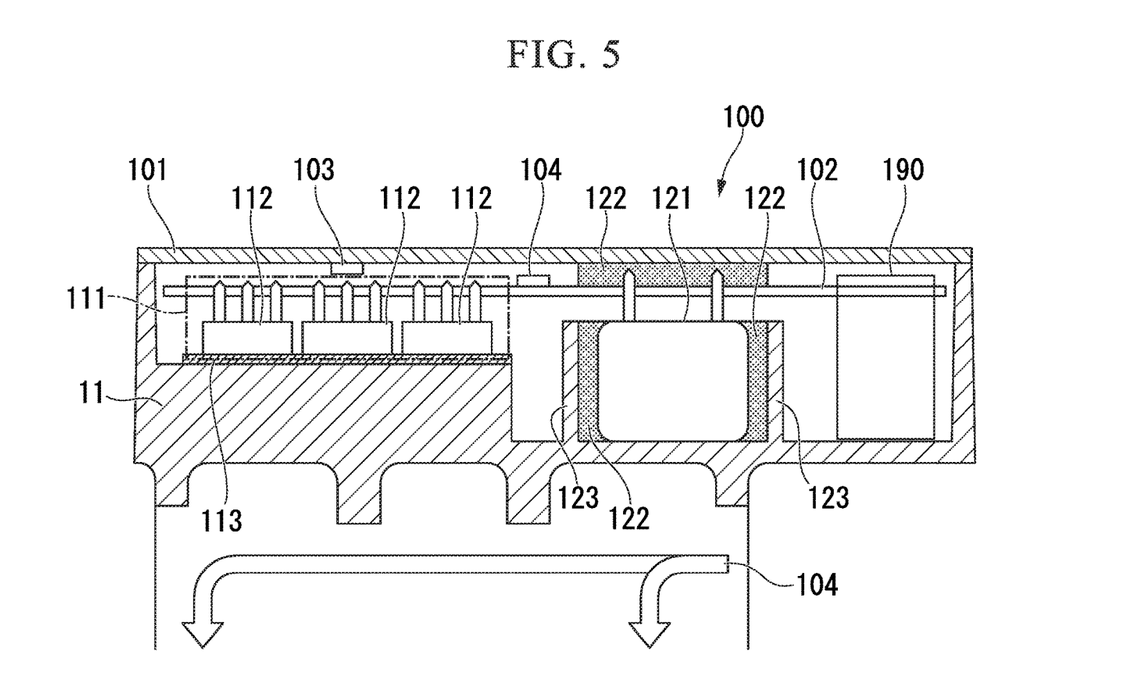
FIG. 5 is a schematic cross-sectional view showing a configuration of an inverter according to a second embodiment of the present invention.

FIG. 5 is a schematic cross-sectional view showing a configuration of an inverter 100 of a second embodiment of the present invention. The inverter 100 is provided in a housing 11. The inverter 100 includes an inverter cover 101, a substrate 102, a temperature sensor 103, a current sensor 104, a power conversion circuit 111 including three power semiconductors 112, a heat-dissipation sheet 113, a capacitor 121, a heat conductive member 122, and a housing wall 123.

In FIG. 5, the same functional portions corresponding to the respective portions of FIG. 2 are assigned the same reference signs (100, 101, 102, 103, 104, 111, 112, 113, and 121) and description thereof will be omitted.

The heat conductive member 122 is provided in contact with at least a part of the capacitor 121 and can conduct heat with at least a part of the capacitor 121. As the heat conductive member 122, for example, a resin such as a high thermal conductive plastic resin or a high thermal conductive nylon resin can be used, but the present invention is not limited thereto. For example, a paste-like member may be used as the heat conductive member 122.

The housing wall 123 is a wall surface provided in contact with the housing 11. The housing wall 123 is lower in temperature than the capacitor 121 because it is in contact with the housing 11 to conduct heat, and corresponds to an example of a member having a lower temperature than the capacitor 121.

Also, the inverter cover 101 in contact with the heat conductive member 122 also corresponds to an example of the member having a lower temperature than the capacitor 121.

In this manner, since heat is dissipated from the capacitor 121 by providing the heat conductive member 122 and the housing wall 123, the capacitor 121 is disposed at a place in which cooling capability is greater than that of the power semiconductor 112.

As described above, since the heat conductive member 122 can conduct heat with at least a part of the capacitor 121 and the heat conductive member 122 is in contact with a member having a temperature lower than that of the capacitor 121, the capacitor 121 can be disposed at a place in which cooling capability is greater than that of the power semiconductor 112. In this manner, since the allowable power of the capacitor 121 at rated use is set to be greater than the allowable power of the power semiconductor 112, as described in the first embodiment, both the power semiconductor 112 and the capacitor 121 can be protected from thermal damage without needing to detect the temperature of the capacitor 121.

Third Embodiment

Figure 6:
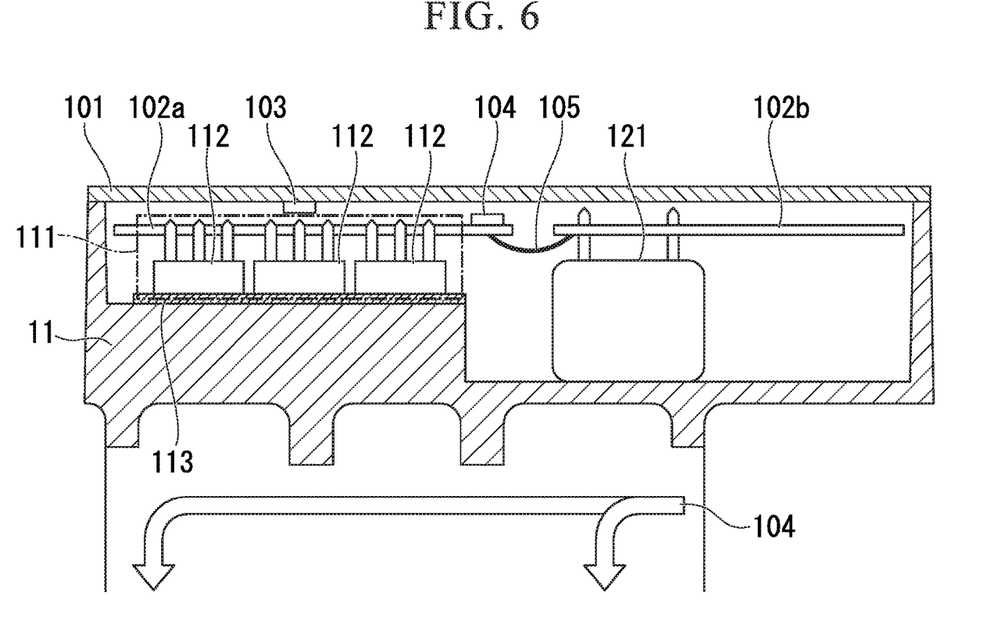
FIG. 6 is a schematic cross-sectional view showing a configuration of an inverter according to a third embodiment of the present invention.

FIG. 6 is a schematic cross-sectional view showing a configuration of an inverter 100 of a third embodiment of the present invention. Referring to FIG. 6, the inverter 100 is provided in the housing 11 and includes an inverter cover 101, substrates 102a and 102b, a temperature sensor 103, a current sensor 104, a power conversion circuit 111 including three power semiconductors 112, a heat-dissipation sheet 113, a capacitor 121, and a conductive member 105.

In FIG. 6, the same functional portions corresponding to the respective portions of FIG. 2 are assigned the same reference signs (100, 101, 102, 103, 104, 111, 112, 113, and 121) and description thereof will be omitted.

The power conversion circuit 111 is provided on the substrate 102a. Also, the capacitor 121 is provided on the substrate 102b. In this manner, a substrate is divided into two in the present embodiment.

The conductive member 105 conducts electricity between the substrate 102a and the substrate 102b. Thus, also in the present embodiment, the same electrical connection relation is provided as in the first embodiment having the integrated substrate 102. On the other hand, the conductive member 105 corresponds to an example of a heat insulating portion and it cannot easily conduct heat. Thereby, heat generated by the power semiconductor 112 cannot be easily conducted to the capacitor 121. In this regard, the capacitor 121 is disposed at a place in which the cooling capability is greater than that of the power semiconductor 112.

As the conductive member 105, various members that are electrically conductive but hard to conduct heat can be used. For example, as the conductive member 105, a conductor whose cross-sectional area is significantly smaller than that of the substrate such as a jumper wire or a bus bar can be used so that heat cannot be easily conducted.

As described above, the power semiconductor 112 and the capacitor 121 are separately provided on different substrates, and the conductive member 105 which can conduct electricity but cannot easily conduct heat is provided between the substrate 102a on which the power semiconductor 112 is provided and the substrate 102b on which the capacitor 121 is provided.

As a result, heat generated by the power semiconductor 112 cannot easily be conduct to the capacitor 121, and in this regard, the capacitor 121 can be disposed at a place in which cooling capability is greater than that of the power semiconductor 112. In this manner, since the allowable power of the capacitor 121 at rated use is set to be greater than the allowable power of the power semiconductor 112, as described in the first embodiment, both the power semiconductor 112 and the capacitor 121 can be protected from thermal damage without needing to detect the temperature of the capacitor 121.

Next, modified examples of the present embodiment will be described with reference to FIGS. 7 to 9. The modified examples described below are not limited to a third embodiment, and can be applied to any of the first embodiment and the second embodiment.

Figure 7:
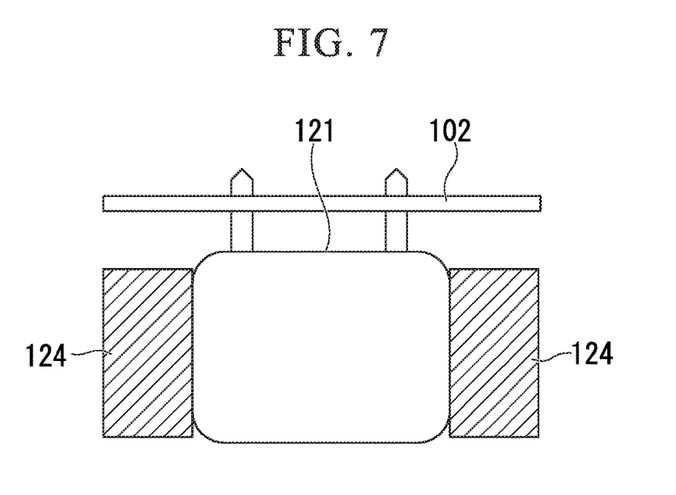
FIG. 7 is a view showing a first modified example of the capacitor according to the third embodiment.

FIG. 7 is a view showing a first modified example of the capacitor 121 according to the present embodiment. Referring to FIG. 7, the capacitor 121 includes heat-dissipation fins 124. Thereby, the capacitor 121 can dissipate heat to the outside via the heat-dissipation fins 124, and in this regard, the capacitor 121 can be disposed at a place in which cooling capability is greater than that of the power semiconductor 112. In this manner, since the allowable power of the capacitor 121 at rated use is set to be greater than the allowable power of the power semiconductor 112, as described in the first embodiment, both the power semiconductor 112 and the capacitor 121 can be protected from thermal damage without needing to detect the temperature of the capacitor 121.

Figure 8:
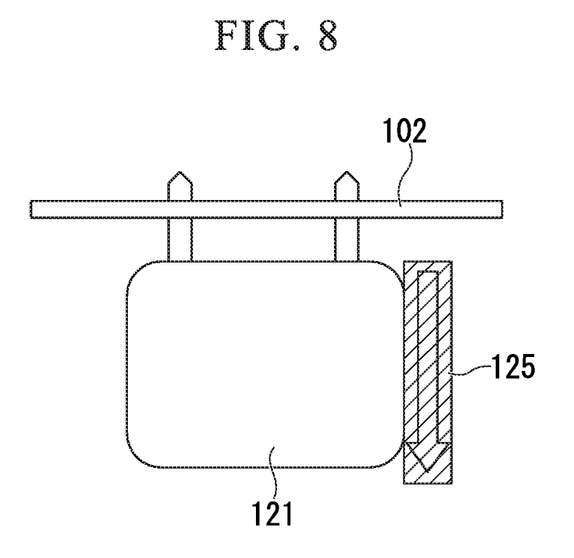
FIG. 8 is a view showing a second modified example of the capacitor according to the third embodiment.

FIG. 8 is a view showing a second modified example of the capacitor 121 according to the present embodiment. Referring to FIG. 8, a heat pipe 125 capable of exchanging heat with the capacitor 121 is provided. The heat pipe 125 is in contact with a member having a temperature lower than that of the capacitor 121 such as the housing 11, for example. Thereby, the capacitor 121 can dissipate heat to the outside via the heat pipe 125, and in this regard, the capacitor 121 can be disposed at a place in which cooling capability is greater than that of the power semiconductor 112. In this manner, since the allowable power of the capacitor 121 at rated use is set to be greater than the allowable power of the power semiconductor 112, as described in the first embodiment, both the power semiconductor 112 and the capacitor 121 can be protected from thermal damage without needing to detect the temperature of the capacitor 121.

Figure 9:
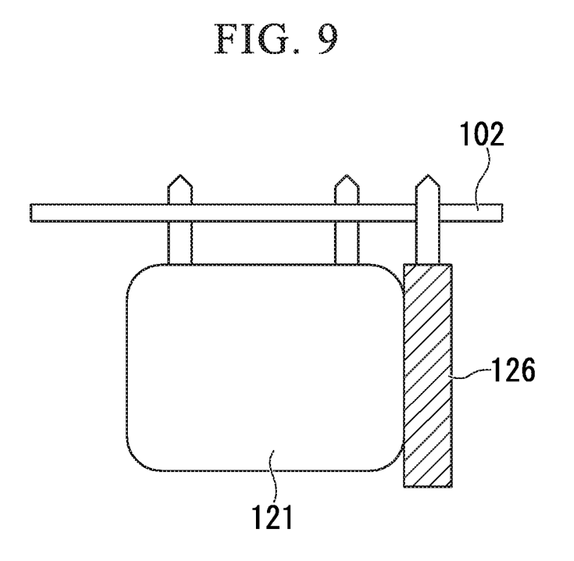
FIG. 9 is a view showing a third modified example of the capacitor according to the third embodiment.

FIG. 9 is a view showing a third modified example of the capacitor 121 according to the present embodiment. Referring to FIG. 9, a Peltier device 126 which absorbs heat from the capacitor 121 is provided. Power supply for the Peltier device 126 can be taken, for example, from the substrate 102.

In this manner, since the Peltier device 126 absorbs heat from the capacitor 121, the capacitor 121 can be disposed at a place in which cooling capability is greater than that of the power semiconductor 112. In this manner, since the allowable power of the capacitor 121 at rated use is set to be greater than the allowable power of the power semiconductor 112, as described in the first embodiment, both the power semiconductor 112 and the capacitor 121 can be protected from thermal damage without needing to detect the temperature of the capacitor 121.

Among the first to third embodiments described above, only one may be implemented, or two or more of these embodiments in combination may be implemented.

In any of the first to third embodiments, a combination of the first component and the second component is not limited to a combination of a power semiconductor and a capacitor, and furthermore, embodiments may be implemented with three or more components.

For example, the first component, the second component, and the third component may be a power semiconductor, an inductor, and a capacitor, respectively. In this case, it is configured to exhibit heat generation of the first component>heat generation of the second component>heat generation of the third component, and under the same temperature condition, it is configured to exhibit an allowable current of the first component>an allowable current of the second component>an allowable current of the third component. Therefore, when the second and third components are sufficiently cooled more than the first component, all the first component, second component, and third component can be protected from thermal damage by monitoring whether the current of the first component does not exceed the allowable current.

Also, when the third component is sufficiently cooled more than the second component, both the second component and the third component can be protected from thermal damage by monitoring whether the current of the second component does not exceed the allowable current.

Alternatively, the first component, the second component, and the third component may be configured as a power semiconductor, a capacitor, and a capacitor, respectively. The capacitor as an example of the third component has lower load, loss, and allowable temperature value than the capacitor as an example of the second component. As the example of the third component, for example, a film capacitor or a ceramic capacitor can be used.

Alternatively, the first component, the second component, and the third component may be configured as a power semiconductor, a capacitor, and a control integrated circuit (IC), respectively. As the control IC, for example, a central processing unit (CPU), a gate driver, a communication photocoupler can be used. Although these control ICs generate little heat, there is a possibility of their exceeding the allowable temperature due to an influence of heat generated by a power semiconductor or the like.

While embodiments of the present invention have been described in detail above with reference to the accompanying drawings, the specific configurations are not limited to the embodiments but may include design changes without departing from the spirit of the present invention.

INDUSTRIAL APPLICABILITY

According to the above-described electric compressor, control device, and monitoring method, it is possible to protect all of the plurality of components from thermal damage without needing to provide a plurality of temperature sensors.

REFERENCE SIGNS LIST

1 Electric compressor
11 Housing
100 Inverter
101 Inverter cover
102, 102a 102b Substrate
103 Temperature sensor
104 Current sensor
105 Conductive member
111 Power conversion circuit
112 Power semiconductor
113 Heat-dissipation sheet
121 Capacitor
122 Heat conductive member
123 Housing wall
124 Heat-dissipation fin
125 Heat pipe
126 Peltier device
200 Motor
300 Compressor

The invention claimed is:

1. An electric compressor comprising:
a compressor which rotates around an axis to compress a fluid;
a motor which rotatably drives the compressor around the axis;
a control unit including a first component configured to convert power externally supplied thereto and a second component, which cooperate together to control current supply to the motor during driving, wherein
when the first component and the second component are exposed to the same temperature, an allowable current of the second component is set to be smaller than an allowable current of the first component,
an allowable temperature of the first component is higher than an allowable temperature of the second component,
the second component is disposed in an upstream side of a refrigerant flow path than the first component such that the second component is disposed at a place in which a difference between the allowable temperature of the first component and the allowable temperature of the second component becomes smaller than a difference between a temperature of the first component and a temperature of the second component,
a temperature sensor which detects the temperature of the first component;
a current sensor which detects a current flowing through the first component; and
a calculation unit which outputs an alarm signal when in the current of the first component is higher than the allowable current of the first component according to the temperature of the first component.

2. The electric compressor according to claim 1, wherein:
the first component and the second component are included in a housing, wherein the refrigerant flow path is laid outside the housing, and
a second thickness of the housing between the second component and the refrigerant flow path is smaller than a first thickness of the housing between the first component and the refrigerant flow path so that second thermal resistance of the housing between the second component and the refrigerant flow path is smaller than first thermal resistance of the housing between the first component and the refrigerant flow path.

3. The electric compressor according to claim 1, further comprising a heat conductive member configured to conduct heat of the second component, wherein the heat conductive member comes in contact with a member having a temperature lower than that of the second component.

4. The electric compressor according to claim 1, further comprising a heat insulating portion configured to conduct electricity, which is provided between a first substrate for mounting the first component and a second substrate for mounting the second component.

5. The electric compressor according to claim 1, wherein the second component includes a heat-dissipation fin.

6. The electric compressor according to claim 1, comprising a heat pipe which is able to exchange heat with the second component, wherein the heat pipe is in contact with a member having a temperature lower than that of the second component.

7. The electric compressor according to claim 1, comprising a Peltier device which absorbs heat from the second component.

8. A control device configured to control a motor rotatably driving a compressor, comprising: a first component configured to convert power externally supplied thereto and a second component, which cooperate together to control current supply to the motor during driving, wherein when the first component and the second component are exposed to the same temperature, an allowable current of the second component is set to be smaller than an allowable current of the first component, an allowable temperature of the first component is higher than an allowable temperature of the second component, the second component is disposed in an upstream side of a refrigerant flow path than the first component such that a difference between the allowable temperature of the first component and the allowable temperature of the second component is smaller than a difference between a temperature of the first component and a temperature of the second component, a temperature sensor which detects a temperature of the first component;

a current sensor which detects a current flowing through the first component; and a calculation unit which outputs an alarm signal when the current of the first component is higher than the allowable current of the first component according to the temperature of the first component.

* * * * *